March 20, 1934.  C. A. WRAGG  1,951,464
AIRCRAFT
Filed Jan. 11, 1930   4 Sheets-Sheet 1

INVENTOR.
Charles A. Wragg
BY David Davis
ATTORNEYS.

March 20, 1934.  C. A. WRAGG  1,951,464
AIRCRAFT
Filed Jan. 11, 1930  4 Sheets-Sheet 2

INVENTOR.
Charles N. Wragg
BY Davis & Davis
ATTORNEYS.

March 20, 1934.   C. A. WRAGG   1,951,464
AIRCRAFT
Filed Jan. 11, 1930   4 Sheets-Sheet 3
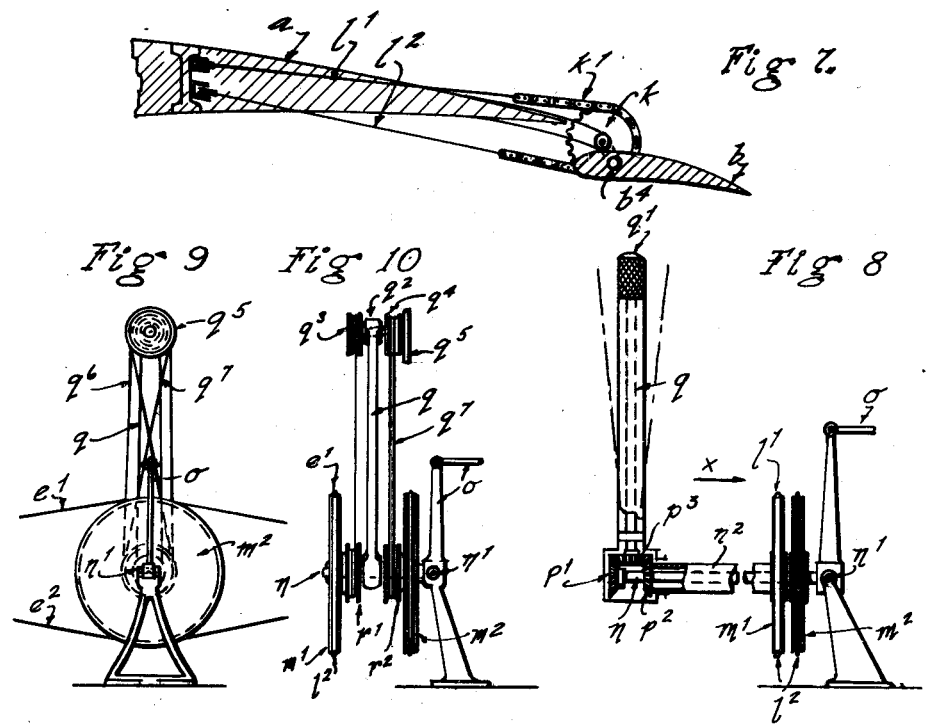
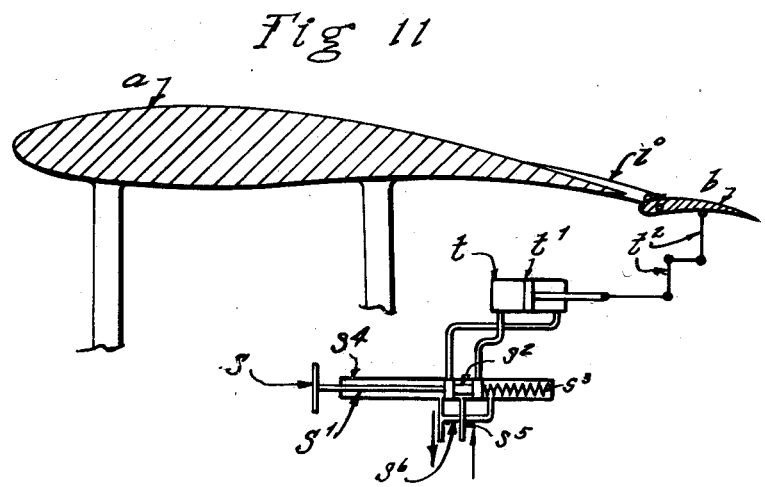
INVENTOR.
Charles A. Wragg
BY Davis & Davis
ATTORNEYS.

March 20, 1934.  C. A. WRAGG  1,951,464
AIRCRAFT
Filed Jan. 11, 1930   4 Sheets-Sheet 4
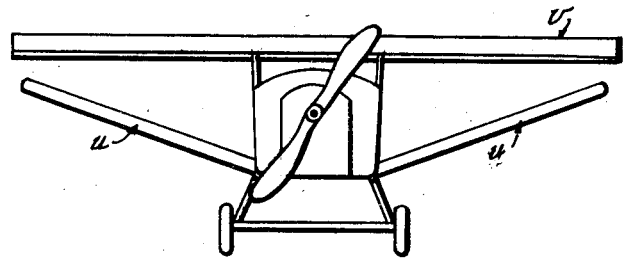
Fig 12
Fig 13
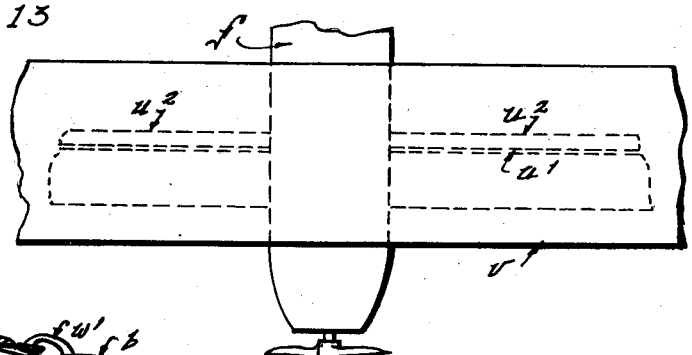
Fig 15
Fig 14
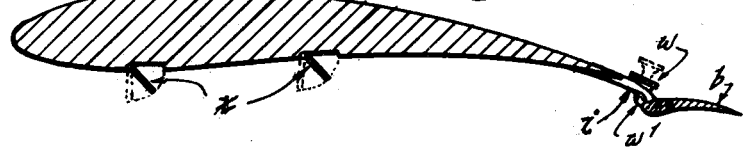
Fig 16
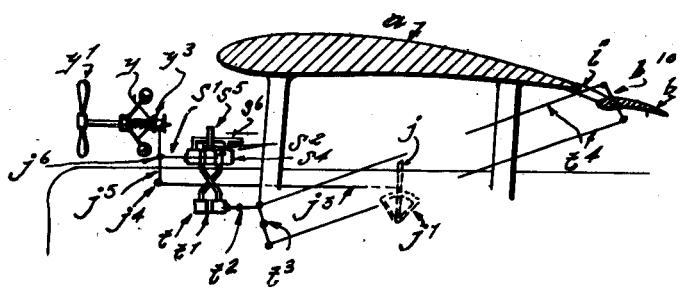
INVENTOR.
Charles A. Wragg
BY Davis & Davis
ATTORNEYS.

Patented Mar. 20, 1934

1,951,464

UNITED STATES PATENT OFFICE 1,951,464

AIRCRAFT

Charles Arthur Wragg, Strand, London, England

Application January 11, 1930, Serial No. 420,091
In Great Britain January 26, 1929

17 Claims. (Cl. 244—12)

This invention relates to wings of the compound type for aircraft such as are described in the specification of my Patents No. 135,829 and No. 216,115.

In the specifications above referred to the compound-wing system is covered broadly as to certain characteristics and theories or principles. I have however for more than a decade investigated wing systems by exhaustive tests in wind tunnels and full scale flight, and the present invention consists in certain improvements showing advantages over arrangements heretofore proposed.

These advantages consist of the capacity to combine certain inconsistent qualities or factors which control performance and which hitherto required compromise in design but which can now be included in a given design with increased efficiency and compact structure.

Briefly, the characteristics of the improved compound wing are such that a basic wing of any given type giving lift at zero incidence of chord can be greatly improved in range of lift and drag co-efficients.

Broadly, an aircraft having a basic wing with which is compounded an auxiliary wing according to the invention, is characterized by the fact that the leading edge of the auxiliary wing is slightly to the rear of the vertical plane containing the trailing edge of the said basic wing, said auxiliary wing having a chord considerably smaller than that of the basic wing and the relative size and position of the said auxiliary wing being such that the vortices in the boundary air layers over the rear portion of the basic wing are materially reduced at low angles and lift increased at high angles of said basic wing while allowing freedom of flow about said auxiliary wing.

The leading edge of the auxiliary wing is, as a rule, set fairly close below the trailing edge of the basic wing so as to be within the region of air turbulence caused by the two streams of air passing over the upper and lower surfaces of the basic wing at different velocities and meeting at the trailing edge. The extent of this region of turbulence varies slightly according to the camber of the basic wing. I have found it satisfactory to set the auxiliary wing with the leading edge of its upper camber below the trailing edge of the basic wing a distance within the range of ten to twenty per cent of the chord of the auxiliary wing, depending upon the camber of the basic wing. Preferably this distance does not exceed one-fourth of the chord of the auxiliary wing and is not less than the distance between the leading edge of the auxiliary wing and the pivot axis of the auxiliary wing.

The auxiliary wing may be fixed or adjustable. A machine to which it is fitted will have lower minimum drag and higher maximum lift, and, according to the particular setting of the auxiliary wing, the lift co-efficient can be either high or low at zero incidence of chord of the basic wing to suit the requirements of the designer. It will be understood that the exact relative angles, proportions, curves and juxtaposition of the basic and auxiliary wings, depending upon the actual speed and loading for which the particular machine is to be designed, will be applied by the usual means at the disposal of designers of aircraft.

When the auxiliary wing is adjustable it may be supported by lugs on its upper surface. In this structure the leading edge of the auxiliary wing is set more to the rear so that clearance is assured when the angle of the auxiliary wing is increased and because of small inequalities along the edges of wings which may occur under the practical conditions of manufacture and assembly. The auxiliary wing may also be supported from below.

Further, the axis on which the auxiliary wing is adapted to turn for change of angle of incidence may be located above or below such auxiliary wing or within the thickness thereof but it should be disposed well forward on the section, at most only a small percentage of the chord back from the leading edge, or it may be at the leading edge or even slightly in advance of the leading edge without departure from this invention; also, the front portion of the auxiliary wing may be fixed and the rear portion adjustable, and the compound structure may be such that the auxiliary wing can be turned through a very wide range of angles from a large negative angle to a vertical position and beyond on occasion.

Now, the aerodynamic results of such an adjustable structure are that at high speed with both elements of the compound wing having chords approximately parallel or embodying a longitudinal dihedral the drag co-efficient is materially reduced as compared with that of the basic wing alone, while at small positive angles of the auxiliary wing relative to the basic wing the maximum ratio of lift to drag (L/D) can be increased in some cases and the function L/D can be improved at angles other than the angle of maximum L/D. As the angle of the auxiliary wing is further increased the lift curve is progressively raised for given angles of the basic wing without any breaks or sudden changes. Thus I obtain a greater range between the minimum drag and the maximum lift co-efficients with a simple structure and without the necessity of tilting the machine as a whole into a dangerous position. In very large machines the pilot would have the considerable advantage of a convenient easily operated means of securing any intermediate degree of lift while retaining the elevator control member for its rightful function exclusively, and of keeping the machine in the position for maximum cruising efficiency with less dependence on tail-trim for variations of load, etc. Operation of huge commercial airliners of the near future would therefore be greatly facilitated and the use of this compound wing invention would bring aviation more quickly into the era of very large machines. Moreover, it is a conviction of the inventor that the full advantage of the invention will only become apparent as higher speeds are attained in commercial usage by which the greater efficiency due to the use of the compound-wing at high speed will be more and more revealed; in other words, its full effect can only be obtained at higher speeds than at present commercially used. At very high angles of the auxiliary wing the total drag of the compound wing can be so greatly increased as to constitute a powerful brake to increase the angle of descent with reduced speed and to retard the machine immediately after landing. In this latter respect the auxiliary wing may be turned through a range of 90° or more.

A further advantage is that when the machine has to be left out-of-doors the auxiliary wing can be set at a large negative angle, thus nullifying lift and increasing safety during storms.

I am aware that tandem systems have been proposed in which the rear wing is adjustable in angle of incidence but none of these discloses the right combination of elements or factors necessary for the results which are obtained by my compound-wing. When the auxiliary wing for instance is set with its leading edge in advance of the trailing edge of the basic wing there is aerodynamic loss that is overcome by my structure. In other staggered tandem schemes hitherto disclosed the chords and sections of the individual wings are similar whereas in my preferred structure they are different. I have found it advisable that not only should the chord of the auxiliary wing be considerably less than that of the basic wing but the centre line of the sections should be different for best results. The disclosures of staggered tandem systems referred to do not reduce the drag co-efficient but increase it and are not true compound wings as herein specified.

A further advantage of my compound wing is that it causes the increased maximum lift coefficient to occur at a lower angle with sustained lift or in other words a flattened curve at the burble. It constitutes in fact rather a delayed burble as the lift curve not only rises to a higher maximum than that of the basic wing alone but declines gradually before the actual burble occurs. This will be readily understood to be of great importance to commercial aviation and to be a true anti-stall device inasmuch as the higher maximum lift is obtained while the machine is more nearly in a normal gliding attitude and the lift does not suddenly drop after the peak is reached. In designs using my compound-wing with ordinary ailerons a result would be that pilots in difficulties or about to land could set the auxiliary at the proper angle to increase lift on the central compounded portion and so change the flying qualities of the machine that speed could be materially reduced yet with lateral control fully maintained. As the peak of the lift curve for the central portion now occurs at a lower angle than that of the aileron portions of the wing the pilot could detect loss of general lift before the ailerons became ineffective.

But in order that the invention may be more readily understood and easily carried into effect it will now be further described with the aid of the accompanying drawings in which;

Fig. 7 is a cross section through a part of a main wing and an auxiliary wing section according to the invention adapted to be operated by the gear shown in Fig. 8 or Figs. 9 and 10.

Fig. 8 is an elevation, partly in section, of one form of gear whereby certain sections of an auxiliary wing can be operated, as in Fig. 4 or Fig. 6, by a control lever or joystick.

Figs. 9 and 10 are elevations at right angles to one another of a modification of the control gear shown in Fig. 8.

Fig. 11 is a diagrammatic view of gear for automatic operation of an auxiliary wing or wings according to the invention.

Figs. 12 and 13 are a diagrammatic elevation and plan of a sesquiplane embodying the invention.

Fig. 14 is a transverse section of a modified wing combination.

Fig. 15 a somewhat similar but fragmentary view illustrating a further modification of the arrangement shown in Fig. 14.

Fig. 16 shows a variant form of the automatic control gear illustrated in Fig. 11.

Figure 1:
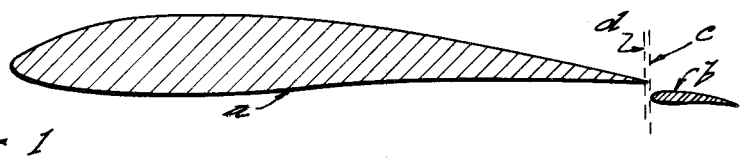
Figs. 1, 2 and 3 are transverse sections of three different wing combinations.

As shown in the diagrammatic section, Fig. 1, the basic wing $a$ and the auxiliary wing $b$ are both of aerofoil section but it will be seen that the chord of the auxiliary wing is very considerably smaller than that of the basic wing. Furthermore, as an essential feature of the invention, the leading edge of the auxiliary wing $b$ lies at a slight horizontal distance $c$ to rear of an imaginary vertical line $d$ drawn through the trailing edge of the basic wing $a$.

Figure 2:
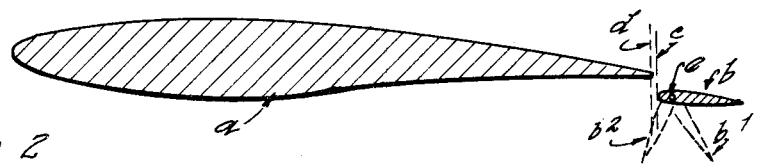

Fig. 2 shows a basic wing $a$ of aerofoil section and an auxiliary wing $b$ of substantially stream line section. This figure also represents the auxiliary wing $b$ as being pivoted at a point $e$ about which it can be tilted downwards (in the positive sense) as indicated by the alternative settings $b^1$ $b^2$, or upwards (in the negative sense) to any desired extent. A setting such as $b^1$, for instance would tend to give increased lift, while a setting such as $b^2$ would produce a powerful braking action on an aircraft in flight or immediately after alighting.

Figure 3:
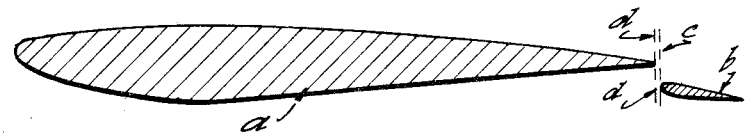

Fig. 3 shows an arrangement wherein the basic and auxiliary wings are constituted by aerofoils of different cross-section.

Figures 4, 5, 6:
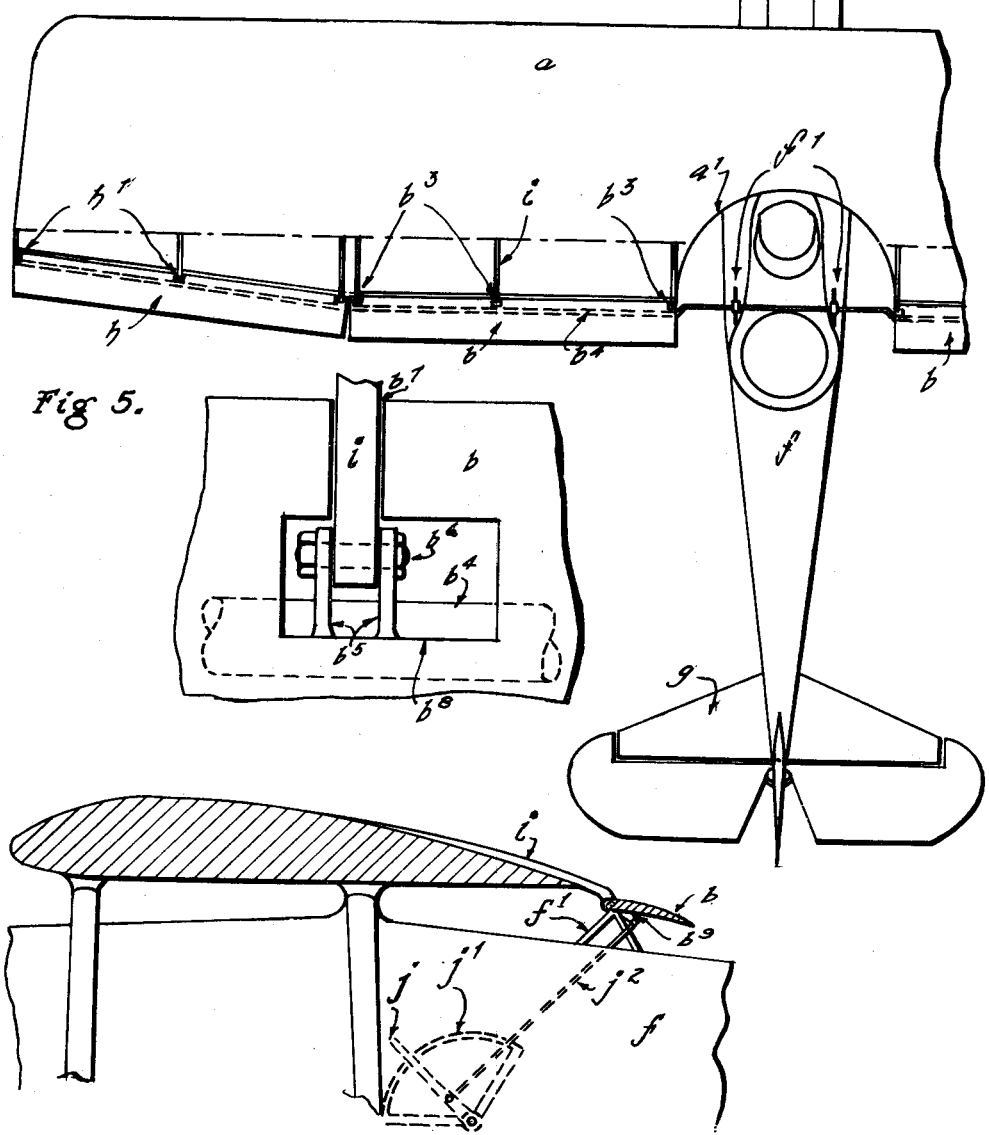
Fig. 4 is a plan of part of an aeroplane showing one way of disposing the auxiliary wings in relation to the main wing.
Fig. 5 is a view to a larger scale of part of Fig. 4.
Fig. 6 is a transverse section showing one simple way of manipulating the auxiliary wings.

Figs. 4, 5 and 6 illustrate the application of the invention to an aeroplane which otherwise may be of more or less conventional monoplane or multiplane type. Here a main plane $a$ constitutes the basic wing. $f$ is the fuselage and $g$ the usual empennage, while more or less ordinary ailerons or differentially acting balancing flaps are provided as at $h$, pivots for the same being indicated at $h^1$ (Fig. 4). Behind the trailing edge of the main plane $a$ between the ailerons $h$ and the central gap $a^1$ auxiliary wings $b$ in accordance with the invention are pivoted at points $b^3$. A tubular member $b^4$ constitutes the main spar for these auxiliary wings.

One of the pivotal connections for the auxiliary wings is shown in detail in Fig. 5. Here it will be seen that the tubular member $b^4$ is furnished at each pivotal point with a pair of lugs $b^5$, spaced apart and apertured to receive a bolt $b^6$. The apertured extremity of an extension $i$ from one of the main ribs of the basic wing enters between the lugs $b^5$ and is pivotally connected to said lugs by the bolt $b^6$ aforesaid. The leading edge of the auxiliary wing may be suitably slotted as at $b^7$, $b^8$ for the accommodation of the hinge the rib extension $i$.

If suitably cranked to bring it into alignment with the pivot bolts $b^6$, the tubular member $b^4$ may afford additional support to the auxiliary wings $b$ by being journalled in brackets $f^1$ mounted on the fuselage $f$ (Figs. 4 and 5).

Fig. 6 shows very simple means for the manual adjustment of the auxiliary wings $b$ by means of a hand lever $j$ adjustable in a quadrant $j^1$ and coupled by a rod $j^2$ to the lever $b^9$ whereby the member $b$ can be rocked on its pivotal axis.

In the arrangement shown in Fig. 4 the ailerons $h$ may be regarded as separate sections of the compound auxiliary wing. In some cases they may extend laterally beyond the wing tips and, in this case they may, if desired, be furnished with or associated with forwardly extending balancing surfaces, in known manner. They, of course, are coupled for differential movement while the members $b$ on each side of the machine are intended to move up or down together. In other cases wing-tip ailerons may be used to enable the compound-auxiliary to be extended approximately full span or even beyond the span of the main or basic wings. It will be obvious that the compound wing can be used in conjunction with any method of lateral control and can be arranged in many forms, such as biplane, or any number and arrangement of multiplanes, including tandem arrangements, and as compound-vanes in helicopters and all machines using revolving blades or vanes for support, as well as in ornithopters and the like. As in the case of ailerons proper so with the compound auxiliary wings (whether or not these also act as ailerons) balancing extensions may be provided to limit the power necessary to enable the incidence of the member to be altered in flight.

The auxiliary wing may be operated by any well known or suitable means such as shown in my previous specifications or by a sprocket and chain, a typical horn being connected by wires to the chain and the sprocket over which the chain runs being operated manually by a handle or by power.

Fig. 7 shows how the auxiliary wing itself may be furnished with a sprocket $k$ over which passes a chain $k^1$ the ends of which are attached to control cables $l^1$, $l^2$ leading to flying controls in the pilot's cockpit.

This method of operation is especially convenient when the members $b$ are intended to work both differentially, as ailerons, and in unison, to increase the total lift. Control means for this purpose are shown in Figs. 8, 9 and 10. It will be seen that the control wires $l^1$ and $l^2$ from the members $b$ on the port and starboard sides of the machine are brought to coaxially mounted drums $m^1$, $m^2$. In the arrangement shown in Fig. 8 the control shaft proper $n$ is universally mounted at $n^1$ so that it can turn about its longitudinal axis and also swing in a more or less vertical sense to enable the elevator transmission members $o$ to be operated in well known fashion. The drum $m^2$ is fixed on the shaft $n$ and the drum $m^1$ on a sleeve $n^2$ concentric with said shaft. The shaft $n$ and sleeve $n^2$ carry respectively the opposing bevel pinions $p^1$, $p^2$ of a differential gear, the intermediate pinion $p^3$ of which can be rotated by a milled head (or wheel) $q^1$ at the top of the control lever, or "joystick" $q$. Fore and aft movement of the joystick $q$ operates the elevator controls in the obvious and well known manner while transverse or athwartships movement thereof causes the drums $m^1$, $m^2$ to rotate together in the same direction, whereby the cables $l^1$, $l^2$ are so worked as to impart differential (aileron) movement to the members $b$. If, however, the head $q^1$ be twisted so as to rotate the bevel $p^3$ of the differential gear, the bevel wheels $p^1$, $p^2$ and, therefore, the drums $m^1$, $m^2$, will obviously be rotated in opposite directions, with the result that the members $b$ will be moved both in the same direction. For instance, if the drum $m^1$ rotates clockwise and the drum $m^2$ counter clockwise (looking in the direction of arrow X) both of the cables $l^1$ will be paid out, while both of the cables $l^2$ will be wound in. Reference to Fig. 7 will make it apparent that this results in the sprocket wheel $k$ being rotated in a direction such as to increase the angle of incidence of the member $b$. An equivalent arrangement is illustrated in Figs. 9 and 10. In this case the drums $m^1$, $m^2$ are both mounted loosely on the control shaft $n$. They are provided respectively with pulley $r^1$ and $r^2$. At the top end of the joystick $q$ is journalled a shaft $q^2$ on which are fixed the pulleys $q^3$, $q^4$ and the hand wheel $q^5$. Pulley $q^3$ is connected to pulley $r^1$ through a straight wire drive $q^6$ while $q^7$ is a crossed wire drive connecting pulleys $q^4$ and $r^2$. Thus the drums $m^1$ and $m^2$ can be rotated in the same direction by laterally rocking the joystick $q$ and in opposite directions by rotating the hand wheel $q^5$ the effect on the members $b$ in each case being the same as that described with reference to Fig. 8.

Means for automatic control and adjustment of the compound auxiliary wing may be provided. For example, in automatic control means, air pressure on a small propeller revolving in the airstream or on a disc, may be utilized to operate a valve which allows fluid under pressure from a suitable source, such as a compressed air tank or auxiliary motor, or power drawn from the power plant of the machine to be transmitted through a double-acting plunger motor connected through a rod or wires to the auxiliary wing. A spring may be used to balance the disc action so that at normal horizontal speed the valve is neutral and the auxiliary wing remains stationary.

One arrangement of this kind is illustrated in Fig. 11 wherein $s$ is a plate exposed to air pressure which, when it exceeds a certain pressure, tends to move said plate, together with the valve rod $s^1$ and valve piston $s^2$ in opposition to a spring $s^3$. Pressure fluid is supplied to the valve casing $s^4$ through a pipe $s^5$ and can be exhausted therefrom through a pipe $s^6$. According to the position taken up by the plate $s$, pressure fluid is supplied to one end or the other of the cylinder $t$ to control the setting of the double acting piston $t^1$ which, through the linkage $t^2$ acts on the auxiliary wing member $b$. The arrangement is such that at normal horizontal flying speed the valve is in neutral position (as shown in the drawings) and the auxiliary wing then remains stationary. If now the air speed of the machine decreases for any reason, such as loss of power, gusts or change of horizontal attitude, the disc $s$ will be pushed out by the spring $s^3$ against the diminishing air pressure; the valve $s^2$ will be moved forward (Fig. 11) to admit fluid under pressure from the pipe $s^5$ to the rear side of the piston $t^1$ of the motor, while allowing the contained fluid to be drawn off from the other side of the said piston. This causes the angle of the auxiliary wing $b$ to increase. The reverse of this action takes place if the flying speed of the machine increases above normal. A centrifugal governor may also be utilized in lieu of the air pressure disc, and means may be used to determine the angular setting of the auxiliary wing by the altitude of the machine and by its attitude with respect to the horizon.

The means dependent upon altitude may for instance take the form of a valve controlled by an altimeter and itself controlling a servo-motor device for shifting the auxiliary wing $b$. Thus, for example, the angle of incidence of the member $b$ might be increased by one degree for every 500 feet or 1000 foot increase of altitude above sea level.

The means dependent upon attitude may, for instance, be a gravity operated pendulum adapted to make electrical or other contacts for opening the valve $s^2$.

Fig. 16, which illustrates a modification of the arrangement according to Fig. 11, shows how a centrifugal governor $y$, driven by an air screw $y^1$, may be used to control the setting of the valve arrangement comprised in the members $s^1$, $s^2$, $s^4$ and thereby to determine the position of the piston $t^1$ in the cylinder $t$. In this case the linkage $t^2$ comprises a lever pivoted at $t^3$ and connected by transmission wires $t^4$ to actuating levers $b^{10}$ on the auxiliary wing $b$. Movement of the piston $t^1$, therefore, results in a corresponding change in the attitude of the auxiliary wing $b$. For the purposes of the automatic control the pivotal point $j^4$, which is coupled by a rod $j^3$ to the hand lever $j$ (working in and adapted to be locked to the quadrant $j^1$), may be regarded as a fixed fulcrum point, about which a lever $j^5$ can swing in response to axial movements of the collar $y^3$ of the governor. The axial location of the collar $y^3$ depends of course, upon the speed of rotation of the air screw $y^1$ and since the valve rod $s^1$ is pivotally connected, at $j^6$ to the lever $j^5$, it follows that the positions of the valve piston $s^2$, the motor piston $t^1$ and the auxiliary wing $b$ depend directly upon the air speed of the machine in flight. Manual control of the auxiliary wing may, however, be effected by shifting the control lever $j$ in the quadrant $j^1$, whereby the rod $j^3$ and pivotal connection $j^4$ are shifted. Under these conditions the lever $j^5$ pivots in the collar $y^3$ of the governor so that axial movement is imparted to the valve rod $s^1$, as will readily be apparent on reference to the drawings. The action of the valve to determine the setting of the auxiliary wing $b$ is, of course, the same as in the case of the automatic control.

Instead of being driven by the auxiliary air screw $y^1$ the governor $y$ may be driven by the engine (or one of the engines) of the aircraft, in which case the attitude of the auxiliary wing $b$ with respect to the main wing $a$ changes automatically in response to variations in engine speed.

Another means of automatic control is to use a small floating aerofoil or flap hinged or otherwise adapted to allow vertical movement with variation of wind pressure and the movements of which operate a valve. Thus, when air pressure on the small aerofoil is increased, as by changes in the velocity of the machine or by changes in the direction or velocity of the air itself, the valve would function to change the angle of the auxiliary wing.

Whatever the means adopted a "cut-out" should be provided by which the pilot may replace the automatic control by positive operation of the auxiliary at will.

The disc, airscrew or aerofoil control member may advantageously be placed well forward on the machine so that the effect of gusts will be somewhat anticipated by the resulting action of the auxiliary wing. Where a nacelle projects ahead of the wings (as it does for a considerable distance in some large machines) the disc or auxiliary air screw etc. and the whole operating mechanism may be at the nose thereof and connected by wire to the auxiliary wing.

A significant aspect of this automatic control is its use in soaring machines or engineless planes which may be flown with a payload for long distances by utilizing energy of the air as in gusts and varying currents. Thus, when a gust is beginning, a control ahead of the wing would set the auxiliary wing in the proper setting to take advantage of the energy in the gust for gain in height and as the gust declined the auxiliary would be set for maximum gliding speed to gain momentum with which to oppose the next gust for further gain in altitude, and so on.

The invention may, as shown in Figs. 12 and 13, advantageously be incorporated in a sesquiplane the small wing $u$ whereof is constituted of a basic wing $u^1$ and an auxiliary wing $u^2$ having a relationship similar to that of the members $a$ and $b$ referred to in the preceding examples. The compound wing $u$ is here combined with a large wing $v$ single or compound type. The small compounded sesquiplane wings may be used for lateral balance control and the large wing constructed without the necessity for ailerons to be incorporated in it, thus further adding to efficiency and simplifying construction.

I may also use one or more small thin sections such as $w$ (Fig. 14), adapted to be set or ejected into the air flow immediately above the rear portion of the basic wing, to augment the work of the compound auxiliary wing particularly at low speed for landing. Figure 14 shows the section $w$ supported by short struts $w^1$ rising from the forward part of the member $b$ and it will also be seen that for normal flying angles the member $w$ may form a continuation of the trailing edge of the wing $a$ as shown in full lines, or may, as indicated in dotted lines, be arranged so as to lie above said trailing edge when the member $b$ is in normal position. A slightly modified arrangement is shown in Fig. 15 and it is also to be understood that the member $w^1$ may with advantage, be attached by a ratchet joint, or otherwise flexibly or movably attached to the auxiliary wing $b$ so as to provide for lost motion between the member $w^1$ and the auxiliary wing, thus permitting the latter to be displaced through a few degrees, say, to a negative angle, without displacing the member *w* while providing for the raising of the latter when a given angle of the auxiliary wing has been reached. If preferred, the member *w* may be operated by separate means, such as a bell crank. Members such as *w* may also be used to counterbalance aerodynamically the pressures set up on the auxiliary wing or wings *b*.

Furthermore, I may use one or more flaps *x* hinged at their front edges preferably to the main spare (not shown) and adapted to fit snugly into the lower surface of the basic wing *a*, any suitable means being provided for turning said flaps downwardly in conjunction with said auxiliary wing.

I claim:

1. Aircraft having a basic wing and an auxiliary wing compounded therewith, characterized by the leading edge of said auxiliary wing being set slightly to the rear of the trailing edge of said basic wing and the upper surface of the anterior portion of the auxiliary wing being of low camber, said auxiliary wing being pivotally mounted for adjustment of its angle of incidence relatively to that of the basic wing and having a chord materially smaller than that of the basic wing and being set below the basic wing with the leading edge of its upper camber spaced below the trailing edge of the basic wing a distance not exceeding one-fourth of the chord of the auxiliary wing and not less than the distance between the leading edge of the auxiliary wing and the pivot axis of the auxiliary wing.

2. Aircraft comprising basic wings and port and starboard auxiliary wings compounded therewith and adapted for angular deflection both differentially for control of lateral balance, and in unison for varying the total lift, combined with a pilot's flying control mechanism comprising a control lever pivoted to rock laterally, a differential mechanism comprising a pair of co-axial upper pulleys borne by the control lever to rotate in unison, a pair of lower pulleys co-axial with the pivot of the control lever and rotatable independently of each other, a crossed belt trained around one of the upper pulleys and one of the lower pulleys, an uncrossed belt trained around the other upper and lower pulleys, one of the lower pulleys being operatively connected to the port auxiliary wing and the other to the starboard auxiliary wing, said differential mechanism being bodily rockable by lateral oscillation of the control lever to impart differential movement to the auxiliary wing and being operable differentially by the rotation of the upper pulleys in unison to deflect the auxiliary wings in the same sense and in unison.

3. Aircraft having a basic wing and an auxiliary wing compounded therewith and pivoted for adjustment of its angle of incidence relatively to the basic wing, in combination with an automatic control mechanism for said auxiliary wing comprising a control member shiftable relatively to the basic wing by pressure of the air speed of the craft, means constanty tending to resist shift of said control member by the air pressure, and means controlled by the shifting of said control member to automatically set the auxiliary wing to an angle appropriate to the prevailing air speed.

4. Aircraft having a basic wing and an auxiliary wing compounded therewith, characterized by the leading edge of said auxiliary wing being set slightly to the rear of the trailing edge of said basic wing and the upper surface of the anterior portion of the auxiliary wing being of low camber, said auxiliary wing being pivotally mounted for adjustment of its angle of incidence relatively to that of the basic wing and having a chord materially smaller than that of the basic wing and being set below the basic wing with the leading edge of its upper camber spaced below the trailing edge of the basic wing a distance not exceeding one-fourth of the chord of the auxiliary wing and greater than the distance between the leading edge of the auxiliary wing and the pivotal axis of the said auxiliary wing.

5. Aircraft having a basic wing and an auxiliary wing compounded therewith and of different cross section, characterized by the leading edge of said auxiliary wing being set slightly to the rear of the trailing edge of said basic wing, the upper surface of the anterior portion of the auxiliary wing being of low camber and the under surface of its anterior portion being of greater camber, the auxiliary wing having a chord materially smaller than that of the basic wing and being set below the basic wing with the leading edge of its upper camber spaced below the trailing edge of the basic ring a distance not exceeding one fourth of the chord of the auxiliary wing and sufficient to permit a free flow of air between said wings.

6. Aircraft according to claim 5 wherein the lower surface of the auxiliary wing is concavo-convex in form.

7. Aircraft having a basic wing and an auxiliary wing compounded therewith, characterized by the leading edge of said auxiliary wing being slightly to the rear of a vertical plane containing the trailing edge of said basic wing, said auxiliary wing being so constructed that the upper surface of its anterior portion is of low camber and said auxiliary wing has a chord considerably smaller than that of the basic wing and is set below the latter with the leading edge of its upper camber spaced below the trailing edge of the basic wing a distance not exceeding one-fourth of the chord of the auxiliary wing, means pivotally mounting the auxiliary wing, whereby its angle of incidence can be adjusted relatively to that of the basic wing, its normal position being such that vortices in the boundary air layers over the rear portion are materially reduced at low angles and lift increased at high angles of said auxiliary wing while permitting freedom of air flow about said auxiliary wing, and means to automatically vary the angle of incidence of the auxiliary wing including a movable member carried by the aircraft and operable in response to variations in the air pressure exerted thereon during flight, the angle of the auxiliary wing being increased by the reduction of pressure on said movable member and decreased by an increase of pressure on said member.

8. Aircraft according to claim 7 wherein a small floating aerofoil or flap is mounted for vertical movement with variation of wind pressure and is operatively connected with a valve, the setting of which determines the angle of incidence of the auxiliary wing.

9. Aircraft according to claim 7 wherein an air pressure plate or disc which moves relatively to a fixed part of the machine in response to variations in air speed actuates by its movements a motor whereby the pivoted auxiliary wing is set to an angle appropriate to the prevailing air speed.

10. Aircraft according to claim 7 wherein a centrifugal governor, the rotary speed of which is dependent on the air speed or on the engine speed is utilized to determine the setting of the auxiliary wing.

11. Aircraft according to claim 7, comprising means whereby the angular setting of the pivoted auxiliary wing is determined by the altitude of the machine in flight.

12. Aircraft according to claim 7, comprising means whereby the angular setting of the pivoted auxiliary wing is determined by the attitude of the machine in flight.

13. Aircraft having a basic wing and an auxiliary wing compounded therewith, characterized by the leading edge of said auxiliary wing being slightly to the rear of a vertical plane containing the trailing edge of said basic wing, said auxiliary wing being so constructed that the upper surface of its anterior portion is of low camber and said auxiliary wing has a chord considerably smaller than that of the basic wing and is set below the latter with the leading edge of its upper camber spaced below the trailing edge of the basic wing a distance not exceeding one-fourth of the chord of the auxiliary wing, means for pivotally mounting the auxiliary wing whereby its angle of incidence can be adjusted relatively to that of the basic wing, its normal position being such that vortices in the boundary air layers over the rear portion are materially reduced at low angles and lift increased at high angles of said auxiliary wing while permitting freedom of air flow about said auxiliary wing, and a thin section adapted to be set into the air flow immediately above the rear portion of the basic wing for the purpose set forth.

14. Aircraft according to claim 13, wherein means are provided for supporting said thin section in such position that for normal flying angles it forms a continuation of the trailing edge of the basic wing.

15. Aircraft according to claim 13, wherein said means supporting the thin section is mounted on the auxiliary wing.

16. Aircraft according to claim 13, wherein there is provided means connecting said thin section to the auxiliary wing by a lost motion connection adapted to permit said auxiliary wing to be deflected to limited extent from its normal position without moving said thin section.

17. In aircraft according to claim 55 the provision of one or more flaps, hinged at their front edges to underside of the basic wing into the surface of which they fit snugly when in their inoperative position, means being provided for turning said flaps downwardly in conjunction with the auxiliary wing.

CHARLES ARTHUR WRAGG.